United States Patent
Tier et al.

(10) Patent No.: US 10,131,222 B1
(45) Date of Patent: Nov. 20, 2018

(54) SNORKEL ROOF DRIP ATTACHMENT

(71) Applicant: Toyota Motor Engineering & Manufacturing North America, Inc., Erlanger, KY (US)

(72) Inventors: Matthew C. Tier, South Lyon, MI (US); Scott L. Frederick, Brighton, MI (US); Stephen E. Freeman, McKinney, TX (US); Jakin C. Wilson, Prosper, TX (US); Greg Bernas, McKinney, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/588,201

(22) Filed: May 5, 2017

(51) Int. Cl.
  *B60K 13/02* (2006.01)
  *B60R 11/00* (2006.01)

(52) U.S. Cl.
  CPC ............. *B60K 13/02* (2013.01); *B60R 11/00* (2013.01); *B60R 2011/004* (2013.01); *B60R 2011/0052* (2013.01)

(58) Field of Classification Search
  CPC .... H01D 45/12; F02M 35/022; F02M 35/024; F02M 35/02; F02M 35/0013; B60K 13/02; B01D 45/12; Y02T 10/146; B60R 11/00; B60R 2011/004; B60R 2011/0052
  See application file for complete search history.

(56) References Cited

U.S. PATENT DOCUMENTS

| | | | | |
|---|---|---|---|---|
| 4,366,878 A | * | 1/1983 | Warf | B60K 13/02 180/68.3 |
| 8,622,266 B2 | * | 1/2014 | McMillan | B60R 3/007 224/323 |
| 8,960,347 B2 | * | 2/2015 | Bennett | B60K 13/02 180/68.3 |
| 9,234,484 B2 | * | 1/2016 | Lewington | F02M 35/10013 |
| 9,440,175 B2 | * | 9/2016 | Niakan | B01D 46/2411 |
| 2012/0175322 A1 | * | 7/2012 | Park | F24J 2/5232 211/41.1 |
| 2013/0062300 A1 | * | 3/2013 | Drake | A47B 57/34 211/183 |

(Continued)

FOREIGN PATENT DOCUMENTS

EP        2130421 B1        3/2015

OTHER PUBLICATIONS

Landrover, "Mantec Raised Air Intake (snorkel)", printed on Feb. 21, 2017 from http://www.discovery2.co.uk/snorkel.html in 23 pages.

*Primary Examiner* — Nkeisha Smith
(74) *Attorney, Agent, or Firm* — Christopher G. Darrow; Darrow Mustafa PC

(57) ABSTRACT

Described herein are various embodiments associated with a bracket for mounting a snorkel to one or more roof rack attachment points of a vehicle. In one embodiment, the bracket comprises a vehicle mounted portion and a snorkel mount portion. The vehicle mounted portion comprises one or more mounting holes. Additionally, values for one or more characteristics of the mounting holes are selected based, at least in part, on the one or more roof rack attachment points. The snorkel mount portion is coupled to the vehicle mounted portion. The snorkel mount portion comprises one or more snorkel attachment holes.

16 Claims, 3 Drawing Sheets

(56) References Cited

U.S. PATENT DOCUMENTS

| | | | |
|---|---|---|---|
| 2014/0360794 A1* | 12/2014 | Tallman | B60K 13/02 180/68.3 |
| 2015/0240760 A1* | 8/2015 | Lewington | F02M 35/10013 95/269 |
| 2016/0108866 A1 | 4/2016 | Dewit et al. | |
| 2017/0130683 A1* | 5/2017 | Somerville | F02M 35/10013 |
| 2017/0145968 A1* | 5/2017 | Gomez | B01D 45/12 |
| 2017/0217380 A1* | 8/2017 | Mahfoudh | B60R 11/00 |
| 2017/0260938 A1* | 9/2017 | Williams | F02M 35/02433 |

* cited by examiner

SNORKEL ROOF DRIP ATTACHMENT

TECHNICAL FIELD

The subject matter described herein relates in general to combustion engine air intakes and, more particularly, to a snorkel roof drip attachment.

BACKGROUND

Some vehicles drive through water. Some of these vehicles have an internal combustion engine that uses air to combust fuel. Air intakes generally provide the air to cylinders of an engine of the vehicle so that combustion can occur. However, the engine can experience difficulties when the air intake is positioned relatively low on the vehicle permitting water to enter the air intake. To prevent water from entering the combustion engine, a vehicle may have a snorkel attached to the air intake on the combustion engine. The snorkel is a pipe or other tube that connects from the air intake at the engine to a relative higher position on the vehicle to avoid the air intake accepting water when the vehicle is traveling through water. Accordingly, an upper opening of the snorkel can be at a position that is level with a roof of the vehicle. Moreover, in some circumstances, attachment points for the snorkel can involve drilling holes in an A-pillar, which may permit moisture and other contaminates to enter the A-pillar.

SUMMARY

This disclosure describes various embodiments for a snorkel roof drip attachment. In one embodiment, a bracket for mounting a snorkel to one or more roof rack attachment points of a vehicle is described. The bracket may comprise a vehicle mounted portion and a snorkel mount portion. The vehicle mounted portion may comprise one or more mounting holes. The one or more characteristics of the mounting holes are selected based, at least in part, on the one or more roof rack attachment points. The snorkel mount portion may be coupled to the vehicle mounted portion. The snorkel mount portion may comprise one or more snorkel attachment holes.

In another embodiment, a system for mounting a snorkel to one or more roof rack attachment points of a vehicle is described. The system may comprise a bracket and one or more fasteners. The bracket may comprise a vehicle mounted portion and a snorkel mount portion. The vehicle mounted portion may comprise one or more mounting holes. The one or more characteristics of the mounting holes are determined based, at least in part, on the one or more roof rack attachment points. The snorkel mount portion may be coupled to the vehicle mounted portion. The snorkel mount portion may comprise one or more snorkel attachment holes. The one or more fasteners may be configured to secure the bracket to the one or more roof rack attachment points.

In another embodiment, a method for mounting a snorkel to one or more roof rack attachment points of a vehicle is described. The method may comprise providing a bracket. The bracket may comprise a vehicle mounted portion comprising one or more mounting holes. The one or more characteristics of the mounting holes are determined based, at least in part, on the one or more roof rack attachment points. The bracket also includes a snorkel mount portion coupled to the vehicle mounted portion, the snorkel mount portion comprising one or more snorkel attachment holes. The method may further comprise providing one or more fasteners configured to secure the bracket to the one or more roof rack attachment points.

DETAILED DESCRIPTION

Described herein are various embodiments of a bracket for attaching a snorkel onto drip channel on a roof of a vehicle. In one embodiment, the bracket uses existing mounting holes located in a drip channel of the vehicle that are provided for mounting a roof rack. An upper end of the snorkel tube may be attached to the roof drip channel using the existing roof rack mounting holes. The bracket may be made of any type of rigid material, for example, the bracket can be comprised of steel, aluminum, reinforced resin, combinations of these materials, and so on. In some embodiments, two holes through which fasteners are inserted may be used to attach the bracket to the roof rack mounting holes. In these embodiments, the bracket may be secured using two bolts threaded into existing weld nuts in the drip channel for the roof rack. If no roof rack is installed above the bracket, a cover may be placed over a part of the bracket attached to the roof to reduce wind noise and cover the fasteners.

Figure 1:
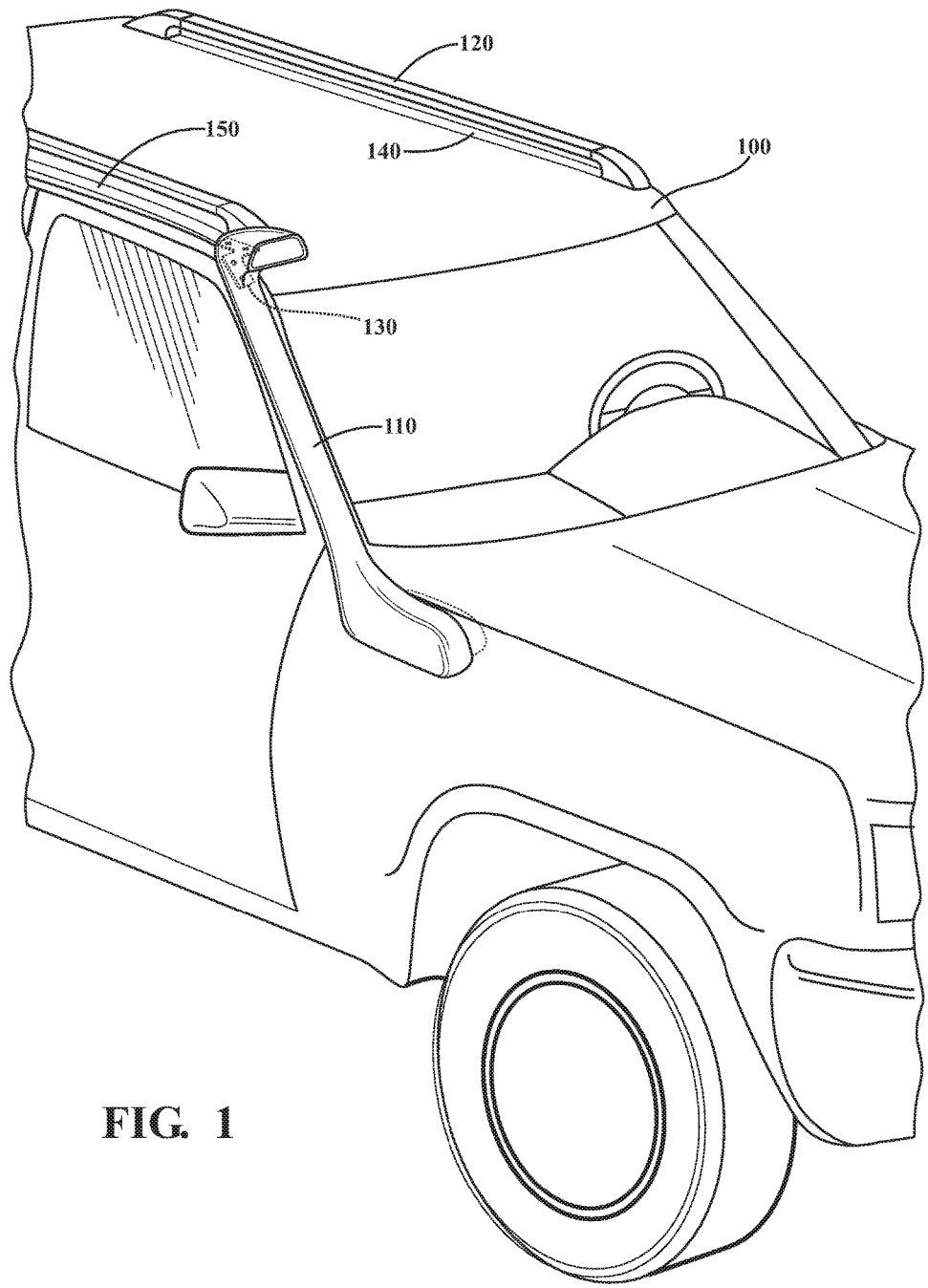
FIG. 1 is a diagram of an embodiment of a vehicle with a roof-mounted snorkel.

FIG. 1 is a diagram of an embodiment of a vehicle 100 with roof mounted snorkel 110. The snorkel 110 may be an apparatus for providing air to a combustion engine (not pictured) that powers vehicle 100. The snorkel 110 may be used on vehicles that travel through water or other wet environments. For example, the snorkel 110 can function to draw air into the combustion engine while the combustion engine is submerged in water, thereby facilitating the continued operation of the combustion engine. In one embodiment, the vehicle 100 may have a roof rack 120. The roof rack 120 carries, for example, cargo on the roof of the vehicle 100. The roof rack 120 can be installed through attachment points located in drip channels 140 and 150 of the vehicle 100. In one embodiment, the attachment points are welded nuts or some other fastening point that is useful for securing the roof rack 120 and/or the bracket 130. The snorkel 110 may be secured to the vehicle 100 by the bracket 130. The bracket 130 may be installed using the attachment points for attaching the roof rack 120. The bracket 130 may be sized to fit in the drip channels 140 and 150. By using the roof rack attachment points, the snorkel 110 may be attached without drilling additional holes in the vehicle 100. Consequently, additional points for water to enter a frame of the vehicle are minimized.

Figure 2:
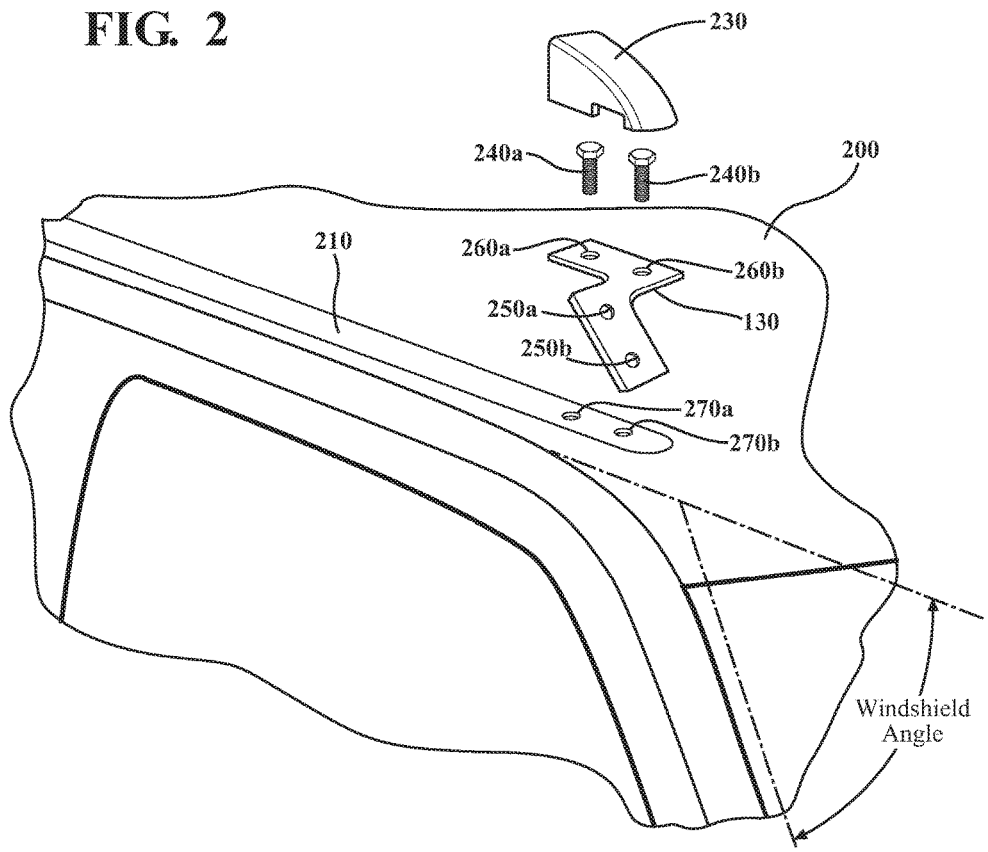
FIG. 2 is a diagram of an embodiment of a system for attaching a snorkel to a vehicle.

FIG. 2 is a diagram of an embodiment of a system for attaching a snorkel to a vehicle 200 that does not include a roof rack. The system can include the bracket 130 and a cover 230. The bracket 130 may be installed in drip channel 210. The bracket 130 may be secured using bolts 240a and 240b. In other embodiments, other types of fasteners may be used to secure the bracket 130. The bolts 240a and 240b may be installed into attachment points 270a and 270b. The attachment points 270a and 270b may be installed at the factory where vehicle 200 is manufactured for use by a roof rack. The bracket 130 may be secured to the vehicle 200 by installing bolts 240a and 240b through mounting holes 260a and 260b. The mounting holes 260a and 260b may be threaded or smooth. A snorkel may be attached to bracket 130 using snorkel attachment holes 250a and 250b. The snorkel attachment holes 250a and 250b may be threaded or may be smooth. A cover 230 may be installed over the drip channel 210 to reduce wind noise and/or drag. Likewise, the cover 230 may be installed to reduce wind noise and/or drag. The cover 230 may be made of any type of material suitable for use on an automobile. The cover 230 may be colored to match trim components of the vehicle 200.

Figure 3:
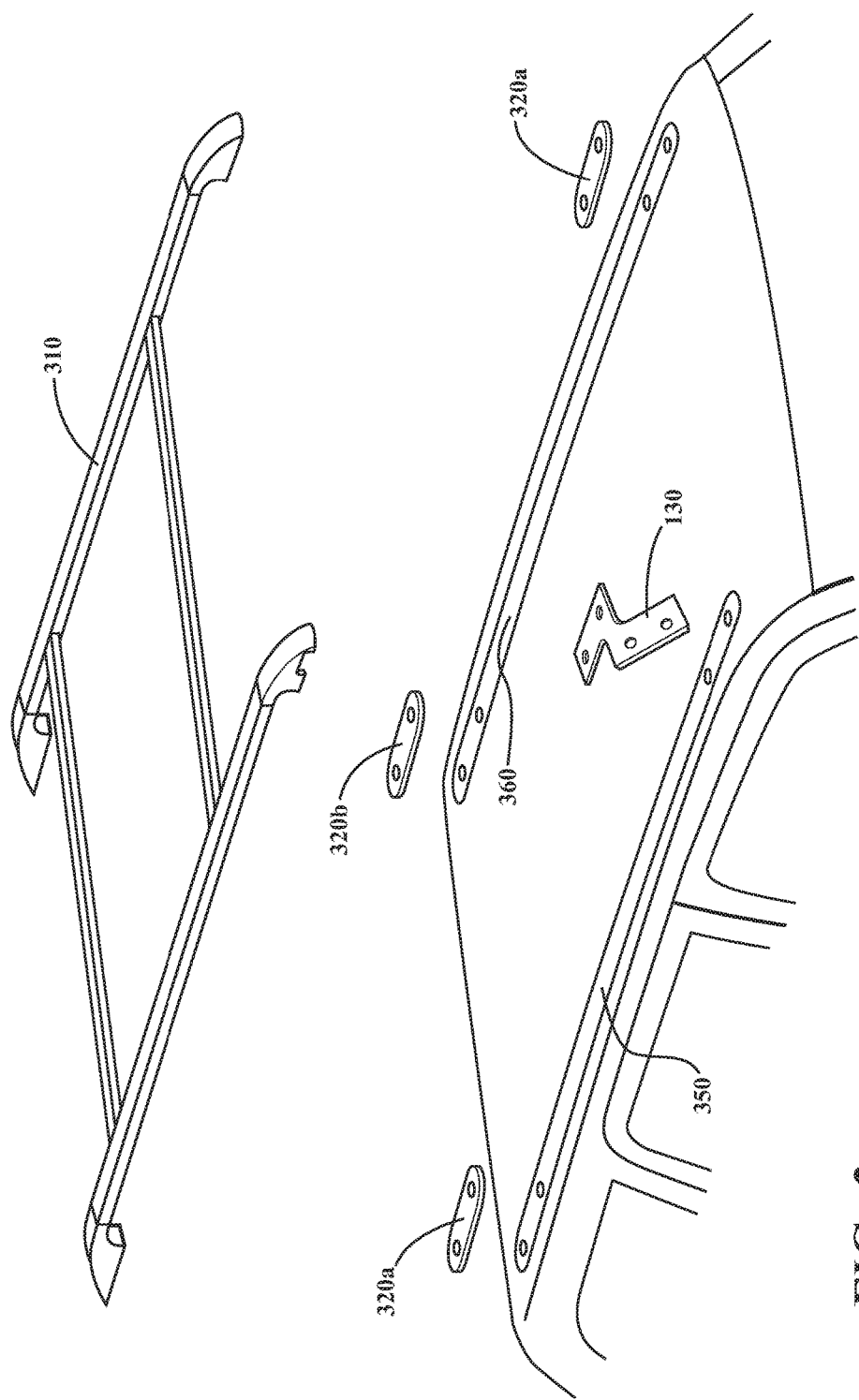
FIG. 3 is a diagram of an embodiment of a system for attaching a snorkel to a vehicle with a roof rack.

FIG. 3 is a diagram of an embodiment of a system for attaching a snorkel to a vehicle 300 with a roof rack 310. The vehicle 300 may be manufactured with a plurality of attachment points for securing the roof rack 310 to the vehicle 300. Additionally, the vehicle 300 may be configured to use a snorkel for air intake into a combustion engine of the vehicle 300. In order to support a snorkel, the bracket 130 may be installed between the roof rack 310 and the roof of vehicle 300. In order to keep the roof rack 310 level, spacers 320a, 320b, and 320c may be used at the corners where bracket 130 is not installed. In one embodiment, a thickness of the spacers 320a, 320b, and 320c may be substantially equal to a thickness of a portion of bracket 130 that is installed between the roof of the vehicle 300 and the roof rack 310. The bracket 130 and the spacers 320a, 320b, and 320c may be installed in drip channels 350 and 360. Moreover, while the bracket 130 and the snorkel are illustrated as being installed on passenger's side of the vehicle 300, in other implementations, the bracket 130 and the snorkel can be installed on a driver's side. In such a case that the bracket 130 is installed on an opposite side of the vehicle 300, the bracket 130 may be provided in a mirrored form to accommodate the opposing configuration.

Figure 4:
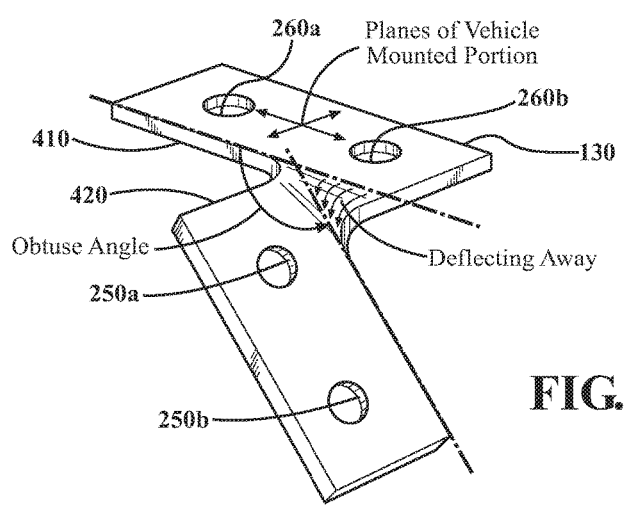
FIG. 4 is a diagram of an embodiment of a bracket for mounting a snorkel to a vehicle.

FIG. 4 is a diagram of an embodiment of the bracket 130 for mounting a snorkel to a vehicle. The bracket 130 may comprise a vehicle mounted portion 410 and a snorkel mount portion 420. The vehicle mounted portion 410 may be sized to fit in a drip channel of a vehicle. Additionally, the vehicle mounted portion 410 may comprise mounting holes 260a and 260b. In one embodiment, characteristics of the mounting holes 260a and 260b may be selected as a function of a vehicle upon which the mounting bracket 130 is to be installed. For example, a size and spacing of the mounting holes 260a and 260b can be selected according to a size and spacing of attachment points, e.g., attachment points 270a and 270b, of the vehicle on which the bracket 130 may be mounted. In some embodiments more or less than two mounting holes may be used.

Furthermore, the snorkel mount portion 420 may be sized to support mounting a snorkel to the vehicle. The snorkel mount portion 420 may comprise snorkel attachment holes 250a and 250b. In some embodiments, more or fewer holes may be provided for mounting the snorkel. That is, in one embodiment, the snorkel mount portion 420 can include a single hole, while in another embodiment, the snorkel mount portion can include three or more holes. In one embodiment, a size and spacing of the snorkel attachment holes 250a and 250b is selected according to a size and spacing of attachment points of a particular snorkel.

As an additional consideration, the vehicle mounted portion 410 and the snorkel mount portion 420 are, in one embodiment, connected together to form an angle. The angle formed by the vehicle mounted portion 410 and the snorkel mount portion 420 is, for example, substantially similar to an angle of a windshield of the vehicle, an angle of an A-pillar relative to the roof of the vehicle, and so on. The snorkel may be installed at an angle similar to the angle of the windshield. The snorkel may be installed parallel to an A-pillar of the vehicle. In general, an orientation of the snorkel may be controlled by the angle formed between the vehicle mounted portion 410 and snorkel mount portion 420.

In the embodiment of FIG. 4, the bracket 130 may be configured for installation on the passenger side of a vehicle. The vehicle mounted portion may be on a side relatively closer to the vehicle than the snorkel mount portion 420. In this embodiment, the snorkel mount portion 420 protrudes away from the vehicle on the passenger side of the vehicle. In another embodiment (not pictured), the bracket 130 may be configured for installation on the driver side of a vehicle. In this embodiment, the snorkel mount portion 420 protrudes away from the vehicle on the driver side of the vehicle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

It will be understood by one having ordinary skill in the art that construction of the described invention and other components are not limited to any specific material. Other exemplary embodiments of the invention disclosed herein may be formed from a wide variety of materials, unless described otherwise herein.

As used herein, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

What is claimed is:

1. A bracket for mounting a snorkel to one or more roof rack attachment points of a vehicle, the bracket comprising:
   a vehicle mounted portion comprising one or more mounting holes for attachment of the bracket to the vehicle, wherein the vehicle mounted portion is substantially rectangular in shape with the mounting holes being substantially centered within a face of the vehicle mounted portion; and a snorkel mount portion coupled to the vehicle mounted portion and having a shape that is substantially rectangular, the snorkel mount portion comprising one or more snorkel attachment holes for attachment of the bracket to the snorkel and being substantially centered within a face of the snorkel mount portion, wherein the snorkel mount portion and the vehicle mounted portion are non-coplanar, wherein the vehicle mounted portion intersects the snorkel mount portion to form an angle that is substantially obtuse with the snorkel mount portion deflecting away from a plane of the vehicle mounted portion.

2. The bracket of claim 1, wherein the one or more mounting holes include at least two separate holes that are spaced apart for attachment with fasteners to the roof rack attachment points of the vehicle.

3. The bracket of claim 1, wherein the one or more mounting holes and the one or more snorkel attachment holes are shaped to accept fasteners for securing the bracket to the vehicle and to the snorkel.

4. The bracket of claim 1, wherein the vehicle mounted portion and the snorkel mount portion are substantially equal in size and shape.

5. A system for mounting a snorkel, the system comprising:

a vehicle including one or more roof rack attachment points located approximately within a roof of the vehicle; and a bracket comprising:

a vehicle mounted portion comprising one or more mounting holes, wherein one or more characteristics of the mounting holes are based, at least in part, on the one or more roof rack attachment points; and a snorkel mount portion coupled to the vehicle mounted portion, the snorkel mount portion comprising one or more snorkel attachment holes for attaching the bracket to the snorkel, wherein the vehicle mounted portion intersects the snorkel mount portion to form an angle substantially equal to a windshield angle of the vehicle relative to a roof of the vehicle, wherein the vehicle mounted portion and the snorkel mount portion are substantially rectangular and are non-coplanar.

6. The system of claim 5, wherein the one or more characteristics comprise a spacing between the one or more mounting holes, wherein the spacing corresponds to a distance between the one or more roof rack attachment points, and wherein the one or more roof rack attachment points are existing bolt holes of the vehicle.

7. The system of claim 5, wherein the snorkel is attached to the snorkel mount portion that is parallel to an A-pillar of the vehicle, and wherein the snorkel is at least partially supported by the bracket.

8. The system of claim 5, further comprising:

one or more fasteners configured to secure the bracket to the one or more roof rack attachment points, wherein the vehicle mounted portion is sized to match a size of a roof rack column attached to the roof rack attachment points.

9. The system of claim 8, further comprising a plurality of spacers, wherein a thickness of the spacers is substantially equal to a thickness of the vehicle mounted portion.

10. The system of claim 5, further comprising a cover, the cover configured to attach to the vehicle mounted portion.

11. A method for mounting a snorkel to one or more roof rack attachment points of a vehicle, the method comprising:

providing a bracket comprising:

a vehicle mounted portion comprising one or more mounting holes for attaching the bracket to the vehicle, wherein one or more characteristics of the mounting holes are selected based, at least in part, on the one or more roof rack attachment points; and a snorkel mount portion coupled to the vehicle mounted portion, the snorkel mount portion comprising one or more snorkel attachment holes for attaching the bracket to the snorkel;

providing one or more fasteners configured to secure the bracket to the one or more roof rack attachment points through the one or more mounting holes, wherein the vehicle mounted portion intersects the snorkel mount portion to form an angle substantially equal to a windshield angle of the vehicle, and wherein the vehicle mounted portion and the snorkel mount portion are non-coplanar.

12. The method of claim 11, wherein the one or more characteristics comprise a spacing between the one or more mounting holes, and wherein the spacing corresponds to a distance between the one or more roof rack attachment points.

13. The method of claim 11, wherein the snorkel may be attached to the snorkel mount portion parallel to an A-pillar of the vehicle.

14. The method of claim 11, wherein the vehicle mounted portion is sized to match a size of a roof rack column attached to the roof rack attachment points.

15. The method of claim 14, further comprising providing a plurality of spacers, wherein a thickness of the spacers is substantially equal to a thickness of the vehicle mounted portion.

16. The method of claim 11, further comprising providing a cover, the cover configured to attach to the vehicle mounted portion.

* * * * *